US011564220B2

(12) United States Patent
Jia et al.

(10) Patent No.: US 11,564,220 B2
(45) Date of Patent: Jan. 24, 2023

(54) RESOURCE ASSIGNMENT METHOD, RELATED DEVICE, AND APPARATUS

(71) Applicant: HUAWEI TECHNOLOGIES CO., LTD., Shenzhen (CN)

(72) Inventors: Qiong Jia, Shanghai (CN); Jun Zhu, Shenzhen (CN); Ji Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 105 days.

(21) Appl. No.: 17/169,808

(22) Filed: Feb. 8, 2021

(65) Prior Publication Data

US 2021/0168773 A1 Jun. 3, 2021

Related U.S. Application Data

(63) Continuation of application No. PCT/CN2019/100025, filed on Aug. 9, 2019.

(30) Foreign Application Priority Data

Aug. 10, 2018 (CN) .......................... 201810910307.3

(51) Int. Cl.
*H04W 72/04* (2009.01)
*H04L 27/26* (2006.01)

(52) U.S. Cl.
CPC ....... *H04W 72/042* (2013.01); *H04L 27/2651* (2021.01); *H04W 72/0453* (2013.01)

(58) Field of Classification Search
CPC ..... H04W 24/10; H04W 72/04; H04W 24/02; H04L 5/00
See application file for complete search history.

(56) References Cited

U.S. PATENT DOCUMENTS

2012/0281641 A1 11/2012 Cui et al.
2021/0076445 A1* 3/2021 Tsai ........................ H04L 5/003
2021/0266896 A1* 8/2021 Choi ..................... H04L 5/0098

FOREIGN PATENT DOCUMENTS

CN 106304380 A 1/2017
CN 106656891 A 5/2017
(Continued)

OTHER PUBLICATIONS

3GPP. "3rd Generation Partnership Project; Technical Specification Group Radio Access Network; NR; Multiplexing and channel coding (Release 15)." 3GPP TS 38.212 V15.2.0 (Jun. 2018). 98 pages.
(Continued)

*Primary Examiner* — Ayaz R Sheikh
*Assistant Examiner* — Debebe A Asefa
(74) *Attorney, Agent, or Firm* — Maier & Maier, PLLC

(57) ABSTRACT

A resource assignment method, a related device, and an apparatus. The method includes: receiving, by a terminal from a network device, a resource assignment indication used to indicate frequency domain resource assignment, where the resource assignment indication is used to indicate a plurality of first resource units assigned to the terminal and that the plurality of first resource units are categorized into one or more groups, where a quantity of first resource units in each group is a product of powers of 2, 3, and 5; and performing, by the terminal, discrete Fourier transform based on the plurality of first resource units. According to the resource assignment method, flexible resource assignment can be performed, and spectrum utilization can be improved.

15 Claims, 6 Drawing Sheets

(56) References Cited

FOREIGN PATENT DOCUMENTS

| EP | 3404973 A1 | 11/2018 | |
|---|---|---|---|
| WO | 2017132967 A1 | 8/2017 | |
| WO | WO-2017165450 A1 * | 9/2017 | ......... H04L 27/2613 |
| WO | 2018030791 A1 | 2/2018 | |

OTHER PUBLICATIONS

Ericsson. "Summary of 7.1.3.31 (resource allocation)." TSG-RAN WG1 #93 R1-1807622, Busan, Korea. May 21-25, 2018. 13 pages.

* cited by examiner

RESOURCE ASSIGNMENT METHOD, RELATED DEVICE, AND APPARATUS

CROSS-REFERENCE TO RELATED APPLICATIONS

This application is a continuation of International Application No. PCT/CN2019/100025, filed on Aug. 9, 2019, which claims priority to Chinese Patent Application No. 201810910307.3, filed on Aug. 10, 2018. The disclosures of the aforementioned applications are hereby incorporated by reference in their entireties.

TECHNICAL FIELD

The embodiments relate to the field of communications technologies, and in particular, to a technology applied to uplink resource assignment in an unlicensed frequency band scenario.

BACKGROUND

Rapid development of wireless communications technologies has led to an increasing shortage of spectrum resources, which has facilitated exploration of unlicensed frequency bands. 3GPP has introduced a license assisted access (LAA) technology and an enhanced LAA (eLAA) technology in Release 13 (R-13) and R-14, respectively, that is, a non-standalone LTE/LTE-A system is deployed on unlicensed spectrums to maximize use of unlicensed spectrum resources with assistance of licensed spectrums.

However, there are many regulatory restrictions on use of unlicensed frequency bands. In one aspect, a signal transmission bandwidth (OCB) of the unlicensed frequency bands is limited. For example, in Europe, according to the provisions of the European Telecommunications Standards Institute (ETSI), on the 2.4 GHz frequency band and the 5 GHz frequency band, the signal transmission bandwidth is required to account for at least 80% of the channel bandwidth, and on the 60 GHz frequency band, the signal transmission bandwidth is required to account for at least 70% of the channel bandwidth. In another aspect, a signal transmission power of the unlicensed frequency bands is limited. For example, the ETSI requires a maximum power spectral density of 10 dBm/MHz for a signal on a 5150-5350 MHz frequency band.

For downlink transmission, a base station can make full use of the spectrum resources to satisfy regulatory requirements. However, for uplink transmission, the regulatory restrictions undoubtedly pose great challenges to assignment of uplink resources. In particular, when the assignment of uplink resources is required to satisfy some special requirements, the resource assignment is inflexible.

SUMMARY

The embodiments provide a resource assignment method, a related device, and an apparatus, so as to perform flexible resource assignment and improve spectrum utilization.

According to a first aspect, the embodiments provide a resource assignment method, applied to a terminal side, where the method includes: a terminal receiving, from a network device, a resource assignment indication used to indicate frequency domain resource assignment, where the resource assignment indication is used to indicate a plurality of first resource units assigned to the terminal and that the plurality of first resource units are categorized into one or more groups, and a quantity of first resource units in each group is a product of powers of 2, 3, and 5; and the terminal performs discrete Fourier transform (DFT) based on the plurality of first resource units.

According to a second aspect, the embodiments further provide a resource assignment method, applied to a network device side, where the method includes: a network device sending, to a terminal, a resource assignment indication used to indicate frequency domain resource assignment, where the resource assignment indication is used to indicate a plurality of first resource units assigned to the terminal and that the plurality of first resource units are categorized into one or more groups, and a quantity of first resource units in each group is a product of powers of 2, 3, and 5.

When the methods described in the first aspect and the second aspect are implemented, even if a quantity of assigned frequency domain resources is not a product of powers of 2, 3, and 5, low-complexity DFT can still be implemented by using the methods. Therefore, assignment of the quantity of resources is not constrained by the product of the powers of 2, 3, and 5, flexible resource assignment is implemented, and spectrum utilization is improved as much as possible.

In the first aspect or the second aspect, a plurality of first resource units assigned to the terminal satisfy $C=M_1+M_2+\ldots+M_i$, where C is a total quantity of first resource units assigned to the terminal, i is a quantity of the groups, $M_1, M_2, \ldots,$ and $M_i$ each are a quantity of first resource units included in a corresponding group, and i is a positive integer greater than or equal to 2. Therefore, the performing, by the terminal, of DFT based on the plurality of first resource units includes: performing, by the terminal, DFT based on $M_1, M_2, \ldots,$ and $M_i$ first resource units separately.

In some possible implementations, the terminal performs $N_1, N_2, \ldots,$ and $N_i$ point DFT based on $M_1, M_2, \ldots,$ and $M_i$ first resource units, respectively, where $N_1, N_2, \ldots,$ and $N_i$ are quantities of subcarriers corresponding to $M_1, M_2, \ldots,$ and $M_i$ first resource units, respectively.

In some possible implementations, when i=2, values of $M_1$ and $M_2$ satisfy the following rule: $M_1=k\times a$ and $M_2=j\times b$, where k, j, a, and b each are a product of powers of 2, 3, and 5.

In some possible implementations, the resource assignment indication includes one or more pieces of resource assignment information, and each piece of the resource assignment information is used to indicate one set of first resource units.

In some possible implementations, the resource assignment indication is used to indicate one or more second resource units assigned to the terminal, and each second resource unit includes some of the plurality of first resource units.

In some possible implementations, the resource assignment indication is used to indicate one or more second resource units assigned to the terminal, and a quantity of first resource units included in each second resource unit is a product of powers of 2, 3, and 5.

In some possible implementations, when a plurality of second resource units are assigned to the terminal, quantities of first resource units in at least two of the plurality of second resource units are different.

In some possible implementations, the resource assignment indication is used to indicate one or more sets of first resource units, each set of first resource units is: $R_{start}+/+s*P$, where $R_{start}$ denotes an index of the $1^{st}$ first resource unit in each set of resource units, l=0, 1, 2 ... L−1, l denotes a sequence number of a second resource unit, L denotes a quantity of second resource units assigned to the terminal, s=0, 1, 2 ... Y−1 or s=0, 1, 2 ... Z−1, s denotes a sequence number of a first resource unit in the second resource unit, Y or Z denotes a quantity of first resource units in the second resource unit, P denotes a quantity of first resource units that are on frequency domain resources and that are between two adjacent first resource units in one of the second resource units, $$Y = \left\lfloor \frac{X}{P} \right\rfloor, Z = \left\lceil \frac{X}{P} \right\rceil,$$

and X denotes a quantity of first resource units corresponding to a transmission bandwidth of the terminal.

In some possible implementations, the resource assignment indication is carried in a frequency domain resource assignment field in downlink control information DCI.

In some possible implementations, information that is in the resource assignment indication and that is used to indicate the plurality of first resource units assigned to the terminal is carried in a frequency domain resource assignment field in DCI, and information that is in the resource assignment indication and that is used to indicate that the plurality of first resource units are categorized into one or more groups is carried in a newly added field in the DCI.

For example, if the first resource unit is a resource block RB, when a subcarrier spacing is 15 kHz, a system bandwidth is 40 MHz, and a transmission bandwidth is 216 RBs, a quantity of RBs included in the second resource unit is at least one of the following sets: [108, 72, 54, 36, 27, 24, 18, (15/16), 12, (9/10), 9, (8/9), 8, 6].

Alternatively, for example, if the first resource unit is an RB, when the subcarrier spacing is 30 kHz, the system bandwidth is 80 MHz, and the transmission bandwidth is 217 RBs, the quantity of RBs included in the second resource unit is at least one of the following sets: [(24/25), (15/16), (9/10), (8/9)]. Alternatively, if the first resource unit is a subcarrier set and includes four subcarriers, when the subcarrier spacing is 15 kHz, the system bandwidth is 20 MHz, and the transmission bandwidth is 318 subcarrier sets, the quantity of first resource units included in the second resource unit is at least one of the following sets: [(24/25), (15/16), (9/10), (8/9)].

Alternatively, for example, if the first resource unit is a subcarrier set and includes three subcarriers, when the subcarrier spacing is 15 kHz, the system bandwidth is 20 MHz, and the transmission bandwidth is 424 subcarrier sets, the quantity of first resource units included in the second resource unit is at least one of the following sets: [(24/25), (15/16), (9/10), (8/9), 8].

Alternatively, for example, if the first resource unit is a subcarrier set and includes six subcarriers, when the subcarrier spacing is 15 kHz, the system bandwidth is 20 MHz, and the transmission bandwidth is 212 subcarrier sets, the quantity of first resource units included in the second resource unit is at least one of the following sets: [(15/16), (9/10), (8/9)].

Alternatively, for example, if the first resource unit is a subcarrier set and includes four subcarriers, when the subcarrier spacing is 30 kHz, the system bandwidth is 20 MHz, and the transmission bandwidth is 153 subcarrier sets, the quantity of first resource units included in the second resource unit is at least one of the following sets: [(15/16), 9, (8/9)]. Alternatively, if the first resource unit is a subcarrier set and includes three subcarriers, when the subcarrier spacing is 30 kHz, the system bandwidth is 20 MHz, and the transmission bandwidth is 204 subcarrier sets, the quantity of first resource units included in the second resource unit is at least one of the following sets: [(15/16), 12].

Alternatively, for example, if the first resource unit is a subcarrier set and includes six subcarriers, when the subcarrier spacing is 30 kHz, the system bandwidth is 20 MHz, and the transmission bandwidth is 102 subcarrier sets, the quantity of first resource units included in the second resource unit is 9 or 10.

Alternatively, for example, if the first resource unit is a subcarrier set and includes four subcarriers, when the subcarrier spacing is 60 kHz, the system bandwidth is 20 MHz, and the transmission bandwidth is 72 subcarrier sets, the quantity of first resource units included in the second resource unit is at least one of the following sets: [36, 24, 18, 12].

Alternatively, for example, if the first resource unit is a subcarrier set and includes three subcarriers, when the subcarrier spacing is 60 kHz, the system bandwidth is 20 MHz, and the transmission bandwidth is 96 subcarrier sets, the quantity of first resource units included in the second resource unit is at least one of the following sets: [48, 32, 24, 16, 12].

Alternatively, for example, if the first resource unit is a subcarrier set and includes six subcarriers, when the subcarrier spacing is 60 kHz, the system bandwidth is 20 MHz, and the transmission bandwidth is 48 subcarrier sets, the quantity of first resource units included in the second resource unit is at least one of the following sets: [24, 16, 12].

According to a third aspect, a terminal is provided, where the terminal includes a plurality of functional units and is configured to correspondingly perform the method according to any one of the possible implementations of the first aspect.

According to a fourth aspect, a network device is provided, where the network device includes a plurality of functional units and is configured to correspondingly perform the method according to any one of the possible implementations of the second aspect.

According to a fifth aspect, a terminal is provided, where the terminal is configured to perform the resource assignment method according to the first aspect. The terminal may include a memory, and a processor, a transmitter, and a receiver that are coupled to the memory, where the transmitter is configured to send a signal to another wireless communications device, such as a terminal; the receiver is configured to receive the signal sent by the another wireless communications device, such as a terminal; the memory is configured to store code for implementing of the resource assignment method according to the first aspect; and the processor is configured to execute program code stored in the memory, that is, to perform the resource assignment method according to any one of the possible implementations of the first aspect.

According to a sixth aspect, a network device is provided, where the network device is configured to perform the resource assignment method according to the second aspect. The network device may include a memory, and a processor, a transmitter, and a receiver that are coupled to the memory, where the transmitter is configured to send a signal to another wireless communications device, such as a network device; the receiver is configured to receive the signal sent by the another wireless communications device, such as a network device; the memory is configured to store code for implementing of the resource assignment method according to the second aspect; and the processor is configured to execute program code stored in the memory, that is, to perform the resource assignment method according to any one of the possible implementations of the second aspect.

According to a seventh aspect, a communications system is provided, where the communications system includes a network device and a terminal, where the network device may be the terminal according to the first aspect, and the terminal may be the network device according to the second aspect.

According to an eighth aspect, a computer-readable storage medium is provided, where the computer-readable storage medium stores an instruction, and when the instruction is run on a computer, the computer is enabled to perform the resource assignment method according to the first aspect.

According to a ninth aspect, another computer-readable storage medium is provided, where the computer-readable storage medium stores an instruction, and when the instruction is run on a computer, the computer is enabled to perform the resource assignment method according to the second aspect.

According to a tenth aspect, a computer program product including an instruction is provided, where when the computer program product runs on a computer, the computer is enabled to perform the resource assignment method according to the first aspect.

According to an eleventh aspect, another computer program product including an instruction is provided, where when the computer program product runs on a computer, the computer is enabled to perform the resource assignment method according to the second aspect.

According to the foregoing resource assignment method, the problem in the prior art that low-complexity DFT cannot be performed when the quantity of resources is not a product of powers of 2, 3, and 5 during resource assignment can be resolved. That is, the resource assignment is not limited by the foregoing constraints, so that more flexible resource assignment can be implemented, and resource utilization can be improved as much as possible.

DETAILED DESCRIPTION OF EMBODIMENTS

The embodiments provide an uplink resource assignment method, which may be applied to an uplink resource assignment scenario. Solutions in the embodiments will be clearly described with reference to the accompanying drawings in the embodiments. Specific operation methods in method embodiments may also be applied to an apparatus embodiment or a system embodiment.

Figure 1:
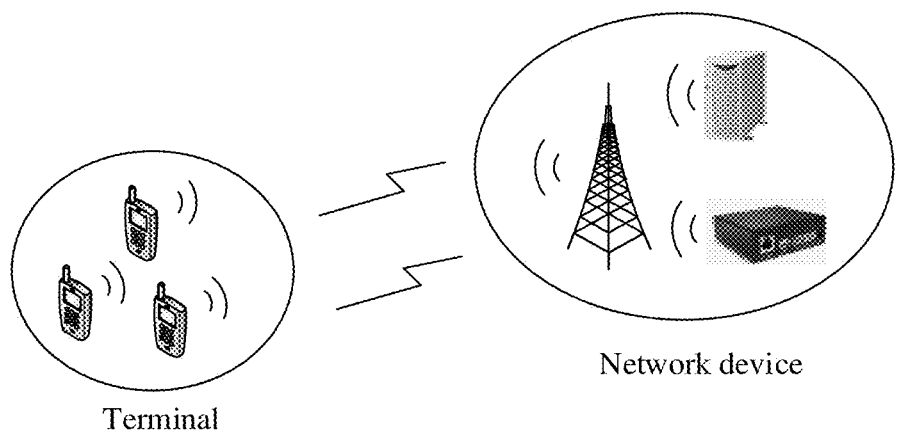
FIG. 1 is a schematic diagram of a scenario according to an embodiment.

FIG. 1 is a simplified schematic diagram of a network architecture to which an embodiment is applied. The network architecture may be a network architecture of a wireless communications system. The wireless communications system may operate on a licensed frequency band or may operate on an unlicensed frequency band. It can be understood that the use of unlicensed frequency bands can improve a system capacity, channel access efficiency, and spectrum resource utilization of the wireless communications system, and ultimately improve system performance.

As shown in FIG. 1, the wireless communications system may include a network device and a terminal, where the network device and the terminal are connected by using a wireless communications technology. It should be noted that the quantity and configuration of the terminal and the network device shown in FIG. 1 are not a limitation on this embodiment. In different embodiments, a wireless communications system may include one or more network devices, and the one or more network devices may be connected to one or more terminals. It should be noted that the network device may also be connected to a core network device, and the core network device is not shown in FIG. 1.

Wireless communications systems mentioned in the embodiments include, but are not limited to, a narrowband Internet of Things (NB-IoT) system, a global system for mobile communications (GSM), an enhanced data rates for GSM Evolution (EDGE) system, a wideband code division multiple access (WCDMA) system, a code division multiple access 2000 (CDMA2000) system, a time division-synchronous code division multiple access (TD-SCDMA) system, a Long Term Evolution (LTE) system, a 5th Generation (5G) mobile communications system, and a future communications system.

In the embodiments, the foregoing network device may be an apparatus deployed in a radio access network to provide a wireless communication function for a terminal. The network device may include, but is not limited to: a base station (BS); a station (STA), including an access point (AP) and a non-AP stations STA; a network controller; a transmission and reception point (TRP); a mobile switching center, or a wireless access point in Wi-Fi; and the like. For example, an apparatus that directly communicates with the terminal through a radio channel may be a base station. The base station may include a macro base station, a micro base station, a relay station, an access point, a remote radio unit (RRU), or the like in various forms. Further, it may be appreciated that the apparatus that performs wireless communication with the terminal may be another network device having a wireless communication function. This is not limited in the embodiments. It should be noted that, in different systems, names of devices having a base station function may be different. For example, in an LTE network, the device is referred to as an evolved NodeB (eNB or eNodeB); in a 3rd generation (3G) network, the device is referred to as a NodeB (Node B); and in a 5G network, the device is referred to as a 5G base station (NR NodeB, gNB).

A terminal, also referred to as a terminal device, may include, for example, user equipment (UE), a mobile station (MS), and a mobile terminal (MT), and is a device that provides voice and/or data connectivity to a user, for example, a handheld device, a vehicle-mounted device, a wearable device, or a computing device having a wireless connection function, or another processing device linked to a wireless modem. Currently, some examples of the terminal include a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, and a wireless terminal in a smart home.

In the embodiments, the terms "network" and "system" may be used interchangeably, and the terms "user" and "terminal" may be used interchangeably, but the meanings thereof can be understood by a person of ordinary skill in the art. In addition, some English abbreviations are described in the embodiments by using an LTE system as an example and may change with evolution of a network. For specific evolution, refer to description in a corresponding standard.

The term "and/or" in the embodiments is only used to describe an association relationship between associated objects and indicates that three relationships may exist. For example, A and/or B may indicate the following: only A exists, both A and B exist, and only B exists. In addition, the character "/" in the embodiments generally indicates that the associated objects are in an "or" relationship.

In the embodiments and accompanying drawings, the terms "first", "second", "third", "fourth", and the like are used to distinguish between different objects, but not to describe a particular order. In addition, the terms "including" and "having" and any variations thereof are intended to cover non-exclusive inclusion. For example, a process, method, system, product, or device including a series of steps or units is not limited to the listed steps or units, but optionally further includes steps or units not listed, or optionally further includes other steps or units inherent to such a process, method, product, or device.

In uplink transmission, for an orthogonal frequency division multiplexing (OFDM) waveform based on DFT (DFT-spread OFDM, DFT-S OFDM), from the perspective of implementation complexity, DFT is generally implemented through a combination of fast Fourier transform (FFT) processing based on bases of 2, 3, and 5 with relatively low complexity. Therefore, a quantity of resources assigned during uplink frequency domain resource assignment is limited to a product of powers of 2, 3, and 5. However, during uplink frequency domain resource assignment, the quantity of resources assigned to the terminal may not be a product of powers of 2, 3, and 5. The embodiments provides the following uplink resource assignment method to resolve the problem that the quantity of resources assigned to the terminal is not a product of the powers of 2, 3, and 5.

Figure 2:
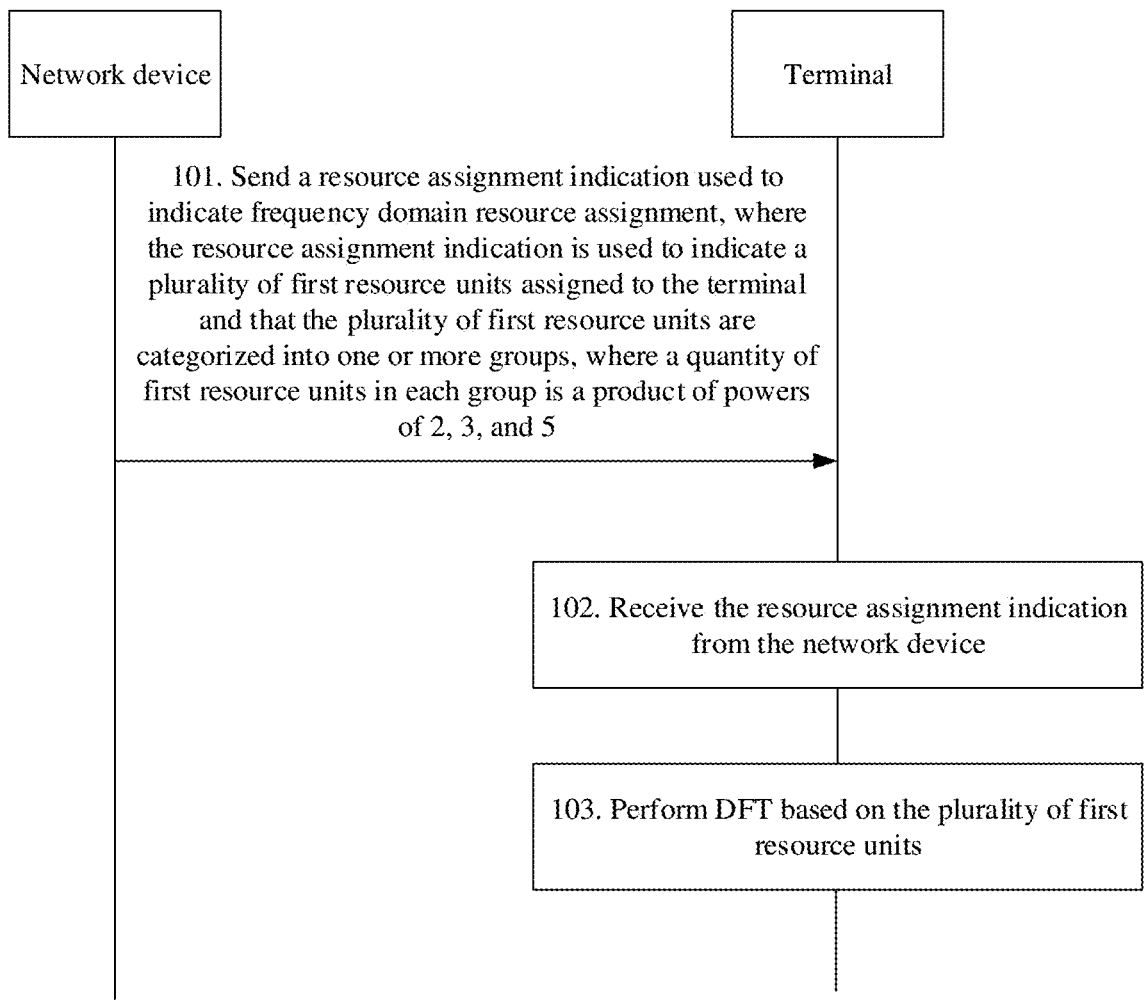
FIG. 2 is a schematic flowchart of a resource assignment method according to an embodiment.

FIG. 2 shows an uplink resource assignment method according to an embodiment. The method is performed through interaction between a network device and a terminal. It should be noted that the network device may interact with one terminal or may interact with a plurality of terminals. One terminal is first used as an example for description below. The uplink resource assignment method includes:

101. A terminal receives, from a network device, a resource assignment indication used to indicate frequency domain resource assignment, where the resource assignment indication is used to indicate a plurality of first resource units assigned to the terminal and that the plurality of first resource units are categorized into one or more groups, where a quantity of first resource units in each group is a product of powers of 2, 3, and 5.

In some implementations, the network device sends, to the terminal, a resource assignment indication used to indicate resource assignment information and resource grouping information. The frequency domain resource assignment information (resource allocation information) is used to indicate that a plurality of first resource units are assigned. The resource grouping information is used to indicate that the plurality of first resource units are categorized into one or more groups, where the quantity of first resource units in each group is a product of powers of 2, 3, and 5.

Optionally, the resource assignment indication is carried in a frequency domain resource assignment field in downlink control information (DCI). Alternatively, the information used to indicate a plurality of first resource units assigned to the terminal in the resource assignment indication is carried in a frequency domain resource assignment field in the DCI, and the information used to indicate that the plurality of first resource units are categorized into one or more groups in the resource assignment indication is carried in a newly added field in the DCI.

In some implementations, both the resource assignment information and the resource grouping information are indicated in an explicit manner, and it may be understood as follows: the resource assignment indication sent by the network device to the terminal includes the resource assignment information and the resource grouping information. For the explicit indication manner, the grouping information may be indicated by frequency domain resource assignment, for example, by reinterpreting/redefining the field, or adding a bit to the field; or the grouping information may be indicated by adding a field to the DCI; or some other fields of the DCI may be reused for indication.

In some other implementations, the resource grouping information may be indicated in an implicit manner, and it may be understood as follows: the resource assignment indication indicated by the network device to the terminal includes only the resource assignment information. For example, the resource assignment information defined in a standard or agreed in a system corresponds to one or more pieces of resource grouping information, and when the resource assignment information corresponds to one piece of resource grouping information, no additional field or bit is required to indicate the resource grouping information; or when the resource assignment information corresponds to a plurality of pieces of optional resource grouping information, the resource assignment indication should include the resource grouping information to indicate the resource grouping information for the terminal. For details, refer to an example in the following embodiment, for example, Table 1.

In different implementations, the first resource unit may be a resource block (RB), a sub resource block (sub RB), a subcarrier, or a subcarrier set (subcarrier set/subcarrier cluster). It can be understood that when the first resource unit is a subcarrier set and a quantity of subcarriers included in the subcarrier set is equal to a quantity of subcarriers included in one RB. For example, if the quantity of subcarriers included in one subcarrier set and the quantity of subcarriers included in one RB are both 12, the first resource unit may also be considered as one RB.

In another implementation, the frequency domain resources assigned by the network device to the terminal may be in units of second resource units, and each second resource unit includes some of the plurality of first resource units. For example, each second resource unit may include non-contiguous first resource units, for example, the second resource unit may be of a resource interlace structure (refer to FIG. 3); that is, the second resource unit includes a specific quantity of first resource units evenly distributed in the entire transmission bandwidth at equal intervals. The interlace structure will be described in more detail below.

Figure 4:
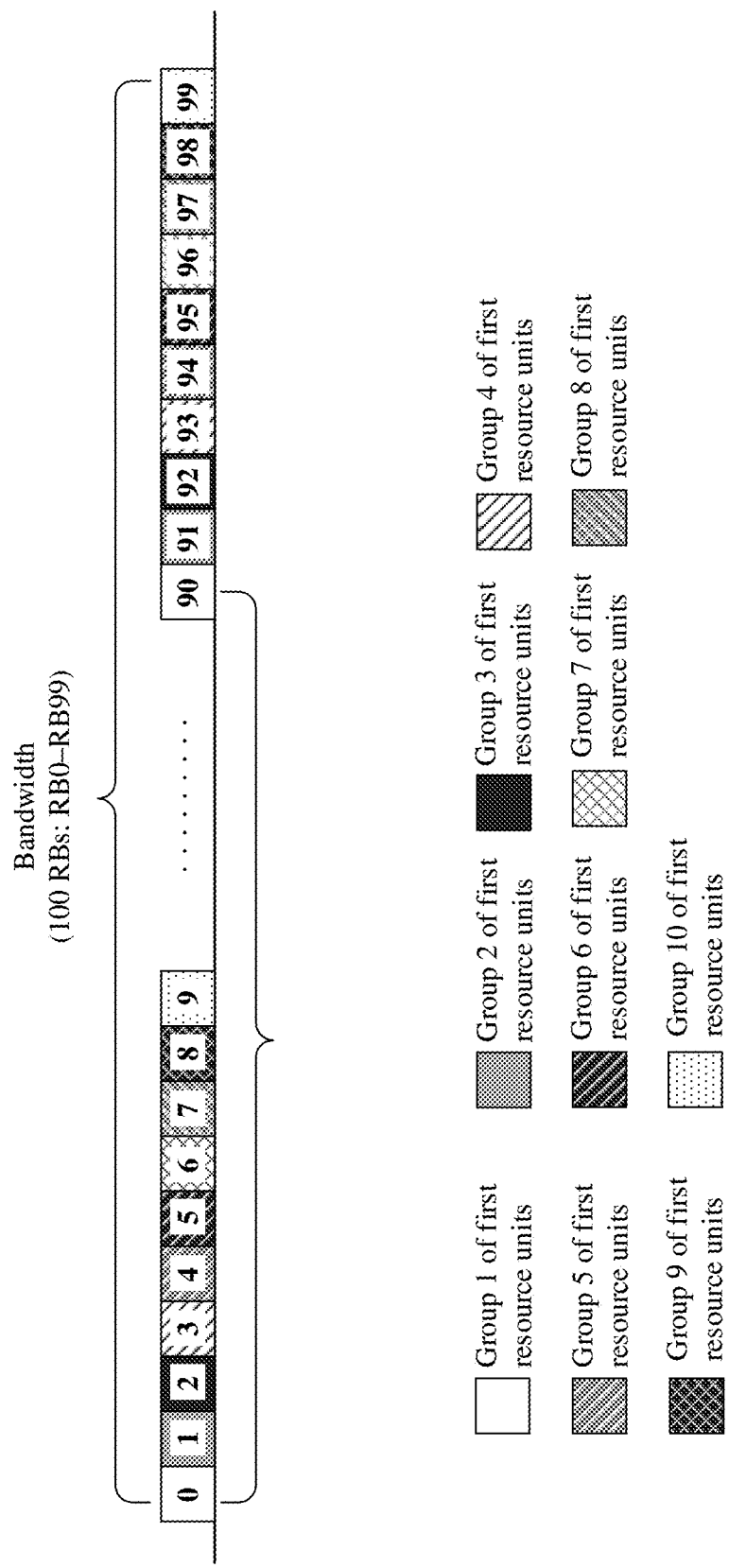
FIG. 4 is a schematic structural diagram of a first resource unit for resource assignment according to another embodiment.

Alternatively, the second resource unit may include contiguous first resource units, for example, a resource block group (RBG) structure, where the RBG is a group of contiguous resource blocks. Alternatively, the second resource unit may include a group of contiguous first resource units. Alternatively, the second resource unit may include a plurality of groups of non-contiguous first resource units, for example, may include a plurality of groups of first resource units distributed at both ends of the transmission bandwidth (refer to FIG. 4).

It can be understood that when a network device assigns a plurality of second resource units to a terminal, the quantities of first resource units included in different second resource units may be the same or different. For example, the first resource unit is an RB, and the second resource unit is in an interlace structure. When the network device assigns a plurality of second resource units to the terminal, some second resource units may each include 11 RBs, and some other second resource units may each include 10 RBs.

In some implementations, the frequency domain resource assignment information and the resource grouping information may be carried in a same field, for example, a resource block assignment field or a frequency domain resource assignment field in DCI. Alternatively, in some other implementations, the resource assignment information and the resource grouping information may be carried in different fields; for example, the resource assignment information is carried in a resource block assignment field or a frequency domain resource assignment field in the DCI, and the resource grouping information is carried in a newly added field in the DCI.

102. The terminal receives the resource assignment indication from the network device to determine an uplink frequency domain resource assigned by the network device to the terminal. The resource assignment indication is used to indicate uplink resource assignment information and the resource grouping information. Based on the resource assignment information, it can be determined that a plurality of first resource units are assigned to the terminal. Based on the resource grouping information, it can be determined that the plurality of first resource units are categorized into one or more groups, where the quantity of first resource units in each group is a product of powers of 2, 3, and 5.

103. The terminal performs DFT based on the plurality of first resource units. After the DFT is completed, the terminal performs subsequent antenna mapping and physical resource mapping to send a signal.

According to the foregoing resource assignment method, the problem in the prior art that low-complexity DFT cannot be performed when the quantity of resources is not a product of powers of 2, 3, and 5 during resource assignment can be resolved; that is, the resource assignment is not limited by the foregoing constraints, so that more flexible resource assignment can be implemented, and resource utilization can be improved as much as possible.

The following provides a more detailed description based on the foregoing method.

In an implementation, the resource assignment indication may include one piece of resource assignment information, and the resource grouping information is implicitly indicated by the resource assignment information. That is, a correspondence between the resource assignment information and the resource grouping information is predetermined in the system, and the terminal may obtain a frequency domain location, a quantity, and the grouping information of the assigned frequency domain resource (a plurality of first resource units) based on the received resource assignment information. For example, in the system, it may be pre-agreed that when 11 RBs are assigned to the terminal, the 11 RBs correspond to two groups, which include five RBs and six RBs, respectively. Therefore, when the terminal receives a resource assignment indication indicating that the terminal is assigned 11 RBs, the terminal may obtain the groups based on the correspondence. The resource assignment information may be a resource indication value (RIV), where the RIV corresponds to an index value of a start first resource unit and a length of the assigned contiguous or non-contiguous first resource units. Therefore, based on the resource indication value sent by the network device, a determined RIV, and grouping information corresponding to the RIV, the terminal may obtain the frequency domain location, the quantity, and the grouping information of the plurality of first resource units included in the frequency domain resource assigned to the terminal.

In another implementation, the resource assignment indication may include a plurality of pieces of resource assignment information, and the resource grouping information is implicitly indicated by the pieces of resource assignment information. For example, each piece of resource assignment information may be an RIV, and one RIV corresponds to an index value of a start first resource unit in the frequency domain resource assigned to the terminal and a length of the assigned contiguous frequency domain resources (which may be understood as the quantity of the assigned first resource units).

Optionally, the plurality of first resource units indicated by each RIV may be considered as a group, where the quantity of first resource units in the group is a product of powers of 2, 3, and 5, that is, the quantity of first resource units in the frequency domain resources indicated by each RIV is a product of powers of 2, 3, and 5.

Optionally, each RIV may correspond to the index value of a start first resource unit assigned by the network device and the quantity of assigned second resource units. Therefore, based on the resource assignment indication sent by the network device, the terminal may obtain the frequency domain location, the quantity, and/or the grouping information of the first resource unit included in the frequency domain resource assigned to the terminal.

Optionally, each of the plurality of RIVs may correspond to one set of first resource units. The set of first resource units may include a plurality of contiguous RBs, or when a plurality of first resource units are assigned in an interlace structure, the set of first resource units may include a plurality of contiguous interlaces.

In another implementation, the resource assignment information may be a RIV, where the RIV corresponds to an index value of a start first resource unit and a plurality of contiguous or non-contiguous first resource units. Therefore, based on the resource indication value sent by the network device, the terminal may obtain the frequency domain location and the quantity of the plurality of first resource units included in the frequency domain resource assigned to the terminal.

In still another implementation, the network device assigns the frequency domain resource based on one or more second resource units and indicates resource assignment information to the terminal accordingly, where each second resource unit includes some of a plurality of first resource units, that is, each second resource unit may include one or more first resource units. The plurality of second resource units may be contiguous or non-contiguous. This is not limited in the embodiments. For example, the resource assignment information may be a bitmap, where the bitmap corresponds to the structure of the assigned one or more second resource units. In this implementation, each second resource unit may include non-contiguous first resource units, for example, in a resource interlace structure. The interlace structure will be described in detail below. Alternatively, each second resource unit may include contiguous first resource units, for example, an RBG, where the RBG is a group of contiguous resource blocks. In other words, the resource assigned by the network device to the terminal may be in the interlace structure, that is, one or more interlaces are assigned to the terminal, where the one or more interlaces may be contiguous or non-contiguous. Alternatively, the resource assigned by the network device to the terminal may be in an RBG structure, that is, one or more RBGs are assigned to the terminal, and the one or more RBGs may be contiguous or non-contiguous. According to the resource indication information sent by the network device, the terminal may learn that the frequency domain resource assigned to the terminal is assigned based on one or more second resource units, and may obtain the frequency domain location and the quantity of the plurality of first resource units assigned to the terminal.

In yet another implementation, when the uplink frequency domain resource assigned by the network device to the terminal includes a plurality of clusters of first resource units, each cluster of first resource units includes a plurality of first resource units, and the clusters of first resource units may be contiguous or non-contiguous in frequency domain. In this case, the resource assignment information may also be a combinatorial index (combinatorial index, as defined in 36.213). For example, the combinatorial index includes an index value of a start first resource unit and an index value of an end first resource unit of each cluster of the assigned plurality of clusters of first resource units; or when a cluster of first resource units corresponds to one or more second resource units, the combinatorial index includes an index value of a start second resource unit and an index value of an end second resource unit in each cluster of first resource units; or when a cluster of first resource units corresponds to one or more second resource units, the combinatorial index corresponds to an index value of a start first resource unit and an index value of an end first resource unit in each cluster of first resource units. Therefore, the terminal device may obtain the frequency domain location and the quantity of first resource units assigned to the terminal device.

The following describes the resource indication information used to indicate one or more second resource units as an example.

In an implementation, the resource assignment indication is used to indicate one or more sets of first resource units, and each set (set) of first resource units is: $R_{start}+l+s*P$, where $R_{start}$ denotes an index of the $1^{st}$ first resource unit in each set of resource units, l=0, 1, 2 . . . L−1, l denotes a sequence number of a second resource unit, L denotes a quantity of second resource units assigned to the terminal, s=0, 1, 2 . . . Y−1 or s=0, 1, 2 . . . Z−1, s denotes a sequence number of a first resource unit in the second resource unit, Y or Z denotes a quantity of first resource units in the second resource unit, and P denotes a quantity of first resource units that are on frequency domain resources and that are between two adjacent first resource units in one of the second resource units. Based on the set, it can be learned that the second resource unit is in an interlace structure.

Figure 3:
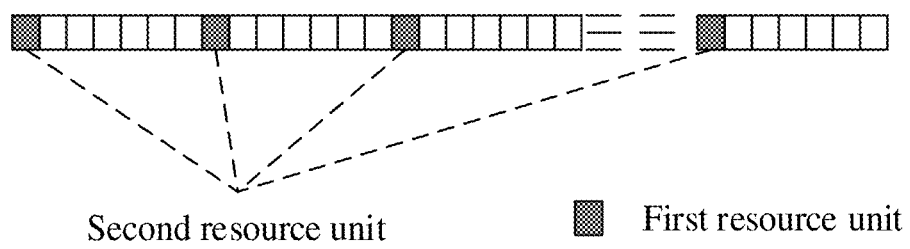
FIG. 3 is a schematic structural diagram of a first resource unit for resource assignment according to an embodiment.

Referring to FIG. 3, an example in which the first resource unit is an RB and the second resource unit is in a resource interlace structure is described. The second resource unit may also be referred to as a cluster. As shown in the figure, the second resource unit includes a plurality of RBs evenly distributed in the transmission bandwidth at equal intervals, and two adjacent RBs are separated by six RBs. Therefore, in the scenario of the unlicensed frequency band, the interlace structure is easier to satisfy regulatory requirements on the occupancy channel bandwidth (OCB).

For values of Y and Z, when the transmission bandwidth of the terminal includes X first resource units, $$Y = \left\lfloor \frac{X}{P} \right\rfloor \text{ and } Z = \left\lceil \frac{X}{P} \right\rceil,$$

where each of Y and Z is a product of powers of 2, 3, and 5. It should be noted that the "transmission bandwidth" may be a transmission bandwidth specified by the system; or, when resource assignment is performed based on a bandwidth part (BWP) or a subband, the "transmission bandwidth" may be a transmission bandwidth corresponding to the BWP or a transmission bandwidth corresponding to the subband.

An example in which a plurality of first resource units are categorized into a plurality of groups is first described below.

In an implementation, the frequency domain resource assigned to the terminal satisfies $C=M_1+M_2+\ldots+M_i$, where C is a total quantity of first resource units assigned to the terminal, i is a quantity of the groups, $M_1, M_2, \ldots$, and $M_i$ each are a quantity of first resource units included in a corresponding group, and i is a positive integer greater than or equal to 2. The step 103 includes: performing, by the terminal, the DFT based on $M_1, M_2, \ldots$, and $M_i$ first resource units separately.

In an implementation, i=2 is used as an example, $C=M_1+M_2$, where $M_1$ and $M_2$ each are a product of powers of 2, 3, and 5, that is, $M_1$ and $M_2$ satisfy the following rule: $M_1, M_2=2^{\alpha_2} \times 3^{\alpha_3} \times 5^{\alpha_5}$, where $\alpha_2$, $\alpha_3$, and $\alpha_5$ are all non-negative integers. When performing the DFT, the terminal performs $N_1$ point DFT for $M_1$ first resource units and $N_2$ point DFT for $M_2$ first resource units.

Optionally, when the first resource unit is an RB, $N_1=M_1\times 12$ and $N_2=M_2\times 12$. For example, assuming that the quantity of RBs assigned to the terminal is 29, the RBs assigned to the terminal are categorized into two groups: $M_1=20$ and $M_2=9$. When performing the DFT, the terminal categorizes the assigned 29 RBs into two groups, performs $N_1=20\times 12=240$ point DTF precoding for one group, and performs $N_2=9\times 12=108$ point DFT for the other group.

Optionally, when the first resource unit is a subcarrier, $N_1=M_1$ and $N_2=M_2$.

In another implementation, i=2 is used as an example, $C=M_1+M_2$, $M_1=k\times a$, and $M_2=j\times b$, where k, j, a, and b each are a product of powers of 2, 3, and 5, and $\alpha_2$, $\alpha_3$, $\alpha_5$ are all non-negative integers. When performing the DFT, the terminal performs $N_1$ point DFT for $M_1$ first resource units and $N_2$ point DFT for $M_2$ first resource units.

Optionally, when the first resource unit is an RB, $N_1=M_1\times 12$ and $N_2=M_2\times 12$.

Optionally, when the first resource unit is a subcarrier, $N_1=M_1$ and $N_2=M_2$.

In an implementation, the resource grouping information is indicated in an implicit manner. For example, the values of a and b are preset values. When the terminal obtains the uplink frequency domain resource assignment information, such as the quantity C of the assigned first resource units, the information about k and j may be obtained. Accordingly, the quantity of first resource units included in each group can be determined based on $M_1=k\times a$ and $M_2=j\times b$. In a possible implementation, the terminal obtains values of k and j according to a preset calculation rule. In another possible implementation, for the preset a and b, the values of k and j corresponding to different values of C may be specified using a table. For example, when a=5 and b=6, the values of k and j corresponding to different values of C or different bandwidths may be obtained by looking up Table 1, and the quantity of first resource units included in each group may be obtained based on the preset values of a and b.

TABLE 1

| System bandwidth: 20 MHz | | System bandwidth: 40 MHz | |
| --- | --- | --- | --- |
| C | [k, j] | C | [k, j] |
| 11 | [1, 1] | 22 | [2, 2] |
| 22 | [2, 2] | 44 | [4, 4] |
| 33 | [3, 3] | 66 | [6, 6] |
| 44 | [4, 4] | 88 | [8, 8] |
| 55 | [5, 5] | 110 | [4, 15] |
| 66 | [6, 6] | 132 | [12, 12] |
| 10 | [2, 0] | 21 | [3, 1] |
| 21 | [3, 1] | 43 | [5, 3] |
| 32 | [4, 2] | 65 | [1, 10] |
| 43 | [5, 3] | 87 | [3, 12] |
| 54 | [6, 4] | 131 | [25, 1] |
| 65 | [1, 10] | 153 | [9, 18] |
| 76 | [8, 6] | 42 | [6, 2] |
| 20 | [4, 0] | 64 | [2, 9] |
| 31 | [5, 1] | 86 | [10, 6] |
| 42 | [6, 2] | 108 | [12, 8] |
| 53 | [1, 8] | 130 | [2, 20] |
| 64 | [2, 9] | 152 | [16, 12] |
| 75 | [3, 10] | 174 | [6, 24] |
| 86 | [10, 6] | 63 | [3, 8] |
| 30 | [6, 0] | 85 | [5, 10] |
| 41 | [1, 6] | 129 | [15, 9] |
| 52 | [8, 2] | 173 | [25, 8] |
| 63 | [3, 8] | 195 | [3, 30] |
| 74 | [4, 9] | 84 | [6, 9] |
| 85 | [5, 10] | 106 | [2, 16] |
| 96 | [12, 6] | 128 | [4, 18] |
| 40 | [2, 5] | 150 | [6, 20] |
| 51 | [3, 6] | 172 | [2, 27] |
| 62 | [10, 2] | 194 | [10, 24] |
| 73 | [5, 8] | 216 | [24, 16] |
| 84 | [6, 9] | | |
| 95 | [1, 15] | | |
| 106 | [2, 16] | | |

When the terminal learns that a=5 and b=6, referring to Table 1, for example, the system bandwidth is 20 MHz, and the quantity of RBs assigned by the network device to the terminal is 11, k=1, and j=1, based on $M_1=k\times a$ and $M_2=j\times b$, it can be learned that $M_1=1\times 5=5$ and $M_2=1\times 6=6$. When DFT is performed, 11 RBs are categorized into two groups, which include five RBs and six RBs, respectively. $N_1=M_1\times 12=5\times 12=60$ point DFT and $N_2=M_2\times 12=6\times 12=72$ point DFT are respectively performed on the two groups. For example, if the system bandwidth is 20 MHz, and the quantity of RBs assigned by the network device to the terminal is 43, k=5, and j=3, based on $M_1=k\times a$ and $M_2=j\times b$, it can be learned that $M_1=5\times 5=25$ and $M_2=3\times 6=18$. When DFT is performed, 43 RBs are categorized into two groups, which include 25 RBs and 18 RBs, respectively. $N_1=M_1\times 12=25\times 12=300$ point DFT and $N_2=M_2\times 12=18\times 12=216$ point DFT are respectively performed on the two groups.

According to the foregoing method, flexible uplink resource assignment indication can be implemented, and by presetting the parameters, the quantity of first resource units in each group does not need to be sent to the terminal each time, so that signaling overheads can be reduced.

A process of the DFT when a plurality of first resource units are categorized into a plurality of groups is described below. For example, the terminal performs DFT based on $M_1, M_2, \ldots,$ and $M_i$ first resource units separately. Because the quantity of first resource units in each group is a product of powers of 2, 3, and 5, the DFT performed on the group may be implemented through FFT processing based on bases of 2, 3, and 5.

In an implementation, when DFT is performed based on a subcarrier granularity, the terminal performs DFT at points $N_1, N_2, \ldots$ and $N_i$ based on $M_1, M_2, \ldots,$ and $M_i$ first resource units, respectively, where $N_1, N_2, \ldots,$ and $N_i$ are the quantities of subcarriers corresponding to $M_1, M_2, \ldots,$ and $M_i$ first resource units, respectively. Optionally, in another implementation, $N_i$ and the quantity of subcarriers corresponding to the $M_i$ first resource units may be equal or unequal. For example, when $N_i$ is greater than the quantity of subcarriers corresponding to $M_i$ first resource units, the DFT may be performed through a zero padding operation.

Figure 5:
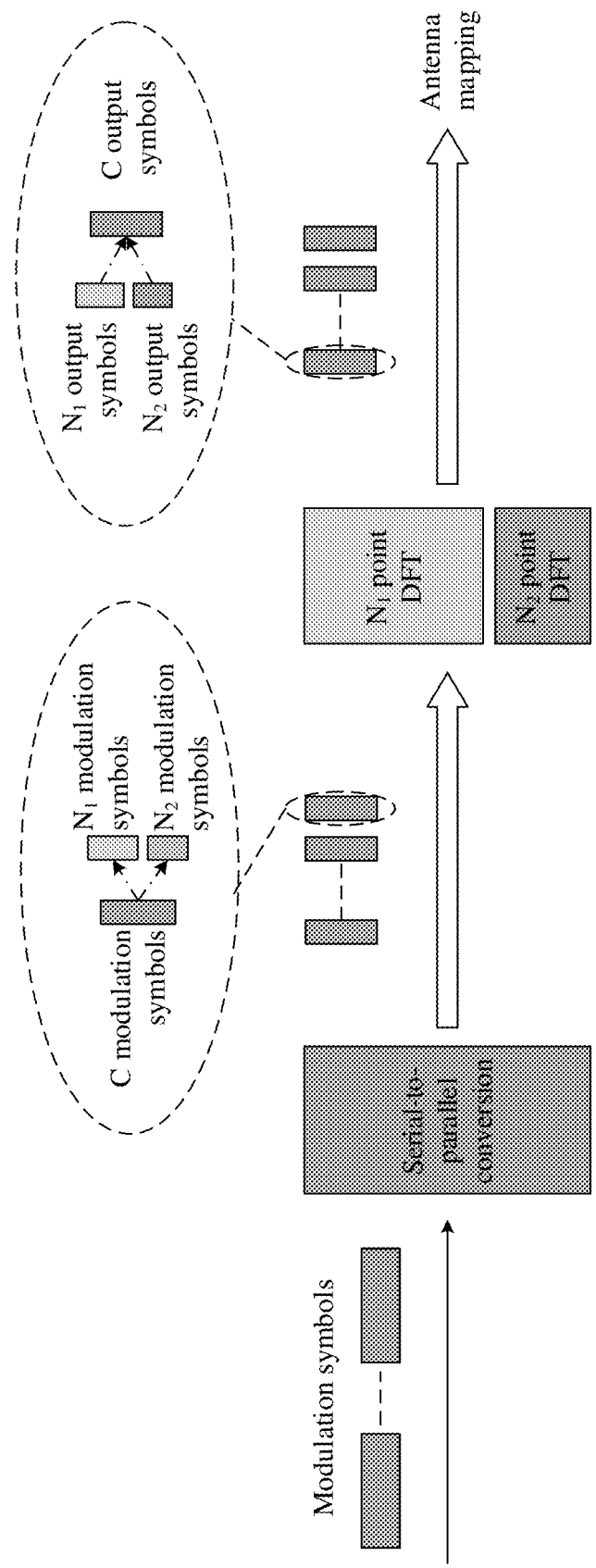
FIG. 5 is a simplified schematic diagram of a DFT process according to an embodiment.

For example, the first resource units are categorized into two groups that correspond to $N_1$ subcarriers and $N_2$ subcarriers, respectively. Because each modulation symbol is modulated onto one subcarrier, C subcarriers correspond to C modulation symbols. Referring to FIG. 5, corresponding to $N_1$ subcarriers and $N_2$ subcarriers, the to-be-processed modulation symbols are categorized into two groups, which include $N_1$ modulation symbols and $N_2$ modulation symbols, respectively. $N_1$ point DFT is performed on the $N_1$ modulation symbols, and $N_1$ output symbols are output. $N_2$ point DFT is performed on the $N_2$ modulation symbols, and $N_2$ output symbols are output. The $N_1$ modulation symbols and the $N_2$ modulation symbols form C output symbols, and antenna mapping and physical resource mapping are performed subsequently to send signals. In another implementation, when the first resource unit is in units of RBs, subcarrier sets, or the like, the DFT based on the bases of 2, 3, and 5 may be implemented based on grouping that satisfies constraints.

Next, an example in which a plurality of first resource units are categorized into one group is described. It can be understood that when a plurality of first resource units are categorized into one group, the network device may not indicate resource grouping information to the terminal. It can also be understood that a plurality of first resource units assigned by the network device to the terminal are not grouped.

An example in which the first resource unit assigned by the network device to the terminal is an RB is first described below.

When the subcarrier spacing is 15 kHz, the system bandwidth is 40 MHz, and the transmission bandwidth is 216 RBs, the quantity of RBs included in the second resource unit may be at least one of the following sets: [108, 72, 54, 36, 27, 24, 18, (15/16), 12, (9/10), 9, (8/9), 8, 6]. For example, each of the one or more second resource units assigned by the network device to a terminal may include 108, 72, 54, 36, 27, 24, 18, 12, 9, 8, or 6 RBs; or the network device assigns a plurality of second resource units to a terminal, and the plurality of second resource units may include a second resource unit including 15 RBs and/or a second resource unit including 16 RBs; or the network device assigns a plurality of second resource units to a terminal, and the plurality of second resource units may include a second resource unit including 9 RBs and/or a second resource unit including 10 RBs; or the network device assigns a plurality of second resource units to a terminal, and the plurality of second resource units may include a second resource unit including 8 RBs and/or a second resource unit including 9 RBs. It should be noted that a specific value (for example, indicating a specific value in a set) assigned by the network device to the terminal may be indicated by the network device in a resource assignment indication (for example, resource assignment information and/or resource grouping information), or may be preset by a system or a standard.

When the subcarrier spacing is 30 kHz, the system bandwidth is 80 MHz, and the transmission bandwidth is 217 RBs, the quantity of RBs included in the second resource unit may be at least one of the following sets: [(24/25), (15/16), (9/10), (8/9)]. For example, the network device assigns a plurality of second resource units to a terminal, and the plurality of second resource units may include a second resource unit including 24 RBs and/or a second resource unit including 25 RBs; or the plurality of second resource units may include a second resource unit including 15 RBs and/or a second resource unit including 16 RBs; or the plurality of second resource units may include a second resource unit including 9 RBs and a second resource unit including 10 RBs; or the plurality of second resource units may include a second resource unit including 8 RBs and a second resource unit including 9 RBs. It should be noted that a specific value (for example, indicating a specific value in a set) assigned by the network device to the terminal may be indicated by the network device in a resource assignment indication (for example, resource assignment information and/or resource grouping information), or may be preset by a system or a standard.

Figure 6:
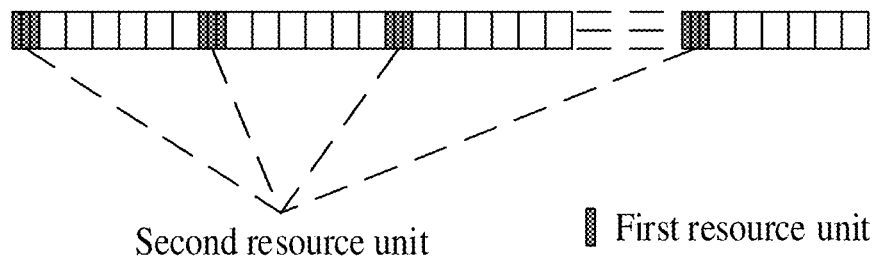
FIG. 6 is a schematic structural diagram of a first resource unit for resource assignment according to an embodiment.

Next, an example in which the first resource unit assigned by the network device to the terminal is a subcarrier set is described. FIG. 6 is a schematic diagram when a first resource unit is a subcarrier set.

When the subcarrier set includes four subcarriers, the subcarrier spacing is 15 kHz, the system bandwidth is 20 MHz, and the transmission bandwidth is 318 subcarrier sets, a quantity of first resource units included in the second resource unit is at least one of the following sets: [(24/25), (15/16), (9/10), (8/9)]. For example, a network device assigns a plurality of second resource units to a terminal, and the plurality of second resource units may include a second resource unit including 24 subcarrier sets and/or a second resource unit including 25 subcarrier sets; or the plurality of second resource units may include a second resource unit including 15 subcarrier sets and/or a second resource unit including 16 subcarrier sets; or the plurality of second resource units may include a second resource unit including 9 subcarrier sets and/or a second resource unit including 10 subcarrier sets; or the plurality of second resource units may include a second resource unit including 8 subcarrier sets and/or a second resource unit including 9 subcarrier sets. It should be noted that a specific value (for example, indicating a specific value in a set) assigned by the network device to the terminal may be indicated by the network device in a resource assignment indication (for example, resource assignment information and/or resource grouping information), or may be preset by a system or a standard.

When the subcarrier set includes three subcarriers, the subcarrier spacing is 15 kHz, the system bandwidth is 20 MHz, and the transmission bandwidth is 424 subcarrier sets, the quantity of first resource units included in the second resource unit is at least one of the following sets: [(24/25), (15/16), (9/10), (8/9), 8]. For example, a network device assigns one or more second resource units to a terminal, and each of the one or more second resource units includes 8 subcarrier sets; or the plurality of second resource units may include a second resource unit including 24 subcarrier sets and/or a second resource unit including 25 subcarrier sets; or the plurality of second resource units may include a second resource unit including 15 subcarrier sets and/or a second resource unit including 16 subcarrier sets; or the plurality of second resource units may include a second resource unit including 9 subcarrier sets and/or a second resource unit including 10 subcarrier sets; or the plurality of second resource units may include a second resource unit including 8 subcarrier sets and/or a second resource unit including 9 subcarrier sets. It should be noted that a specific value (for example, indicating a specific value in a set) assigned by the network device to the terminal may be indicated by the network device in a resource assignment indication (for example, resource assignment information and/or resource grouping information), or may be preset by a system or a standard.

When the subcarrier set includes six subcarriers, the subcarrier spacing is 15 kHz, the system bandwidth is 20 MHz, and the transmission bandwidth is 212 subcarrier sets, the quantity of first resource units included in the second resource unit is at least one of the following sets: [(15/16), (9/10), (8/9)]. For example, a network device assigns a plurality of second resource units to a terminal, and the plurality of second resource units may include a second resource unit including 15 subcarrier sets and/or a second resource unit including 16 subcarrier sets; or the plurality of second resource units may include a second resource unit including 9 subcarrier sets and/or a second resource unit including 10 subcarrier sets; or the plurality of second resource units may include a second resource unit including 8 subcarrier sets and/or a second resource unit including 9 subcarrier sets. It should be noted that a specific value (for example, indicating a specific value in a set) assigned by the network device to the terminal may be indicated by the network device in a resource assignment indication (for example, resource assignment information and/or resource grouping information), or may be preset by a system or a standard.

When the subcarrier set includes four subcarriers, the subcarrier spacing is 30 kHz, the system bandwidth is 20 MHz, and the transmission bandwidth is 153 subcarrier sets, the quantity of first resource units included in the second resource unit is at least one of the following sets: [(15/16), 9, (8/9)]. For example, a network device assigns one or more second resource units to a terminal, and each of the one or more second resource units may include 9 subcarrier sets; or the plurality of second resource units may include a second resource unit including 15 subcarrier sets and/or a second resource unit including 16 subcarrier sets; or the plurality of second resource units may include a second resource unit including 8 subcarrier sets and/or a second resource unit including 9 subcarrier sets. It should be noted that a specific value (for example, indicating a specific value in a set) assigned by the network device to the terminal may be indicated by the network device in a resource assignment indication (for example, resource assignment information and/or resource grouping information), or may be preset by a system or a standard.

When the subcarrier set includes three subcarriers, the subcarrier spacing is 30 kHz, the system bandwidth is 20 MHz, and the transmission bandwidth is 204 subcarrier sets, the quantity of first resource units included in the second resource unit is at least one of the following sets: [(15/16), 12]. For example, a network device assigns one or more second resource units to a terminal, and each of the one or more second resource units may include 12 subcarrier sets; or the plurality of second resource units may include a second resource unit including 15 subcarrier sets and/or a second resource unit including 16 subcarrier sets. It should be noted that a specific value (for example, indicating a specific value in a set) assigned by the network device to the terminal may be indicated by the network device in a resource assignment indication (for example, resource assignment information and/or resource grouping information), or may be preset by a system or a standard.

When the subcarrier set includes six subcarriers, the carrier spacing is 30 kHz, the system bandwidth is 20 MHz, and the transmission bandwidth is 102 subcarrier sets, the quantity of subcarrier sets included in the second resource unit is 9 or 10. For example, the network device assigns one or more second resource units to a terminal, and each of the one or more second resource units may include 9 subcarrier sets; or each of the one or more second resource units may include 10 subcarrier sets. It should be noted that a specific value (for example, indicating a specific value in a set) assigned by the network device to the terminal may be indicated by the network device in a resource assignment indication (for example, resource assignment information and/or resource grouping information), or may be preset by a system or a standard.

When the subcarrier set includes four subcarriers, the subcarrier spacing is 60 kHz, the system bandwidth is 20 MHz, and the transmission bandwidth is 72 subcarrier sets, the quantity of first resource units included in the second resource units is at least one of the following sets: [36, 24, 18, 12]. For example, a network device assigns one or more second resource units to a terminal, and each of the one or more second resource units may include 36 subcarrier sets; or each of the one or more second resource units may include 24 subcarrier sets; or each of the one or more second resource units may include 18 subcarrier sets; or each of the one or more second resource units may include 12 subcarrier sets. It should be noted that a specific value (for example, indicating a specific value in a set) assigned by the network device to the terminal may be indicated by the network device in a resource assignment indication (for example, resource assignment information and/or resource grouping information), or may be preset by a system or a standard.

When the subcarrier set includes three subcarriers, the subcarrier spacing is 60 kHz, the system bandwidth is 20 MHz, and the transmission bandwidth is 96 subcarrier sets, the quantity of first resource units included in the second resource units is at least one of the following sets: [48, 32, 24, 16, 12]. For example, a network device assigns one or more second resource units to a terminal, and each of the one or more second resource units may include 48 subcarrier sets; or each of the one or more second resource units may include 32 subcarrier sets; or each of the one or more second resource units may include 24 subcarrier sets; or each of the one or more second resource units may include 16 subcarrier sets; or each of the one or more second resource units may include 12 subcarrier sets. It should be noted that a specific value (for example, indicating a specific value in a set) assigned by the network device to the terminal may be indicated by the network device in a resource assignment indication (for example, resource assignment information and/or resource grouping information), or may be preset by a system or a standard.

When the subcarrier set includes six subcarriers, the subcarrier spacing is 60 kHz, the system bandwidth is 20 MHz, and the transmission bandwidth is 48 subcarrier sets, the quantity of first resource units included in the second resource units is at least one of the following sets: [24, 16, 12]. For example, a network device assigns one or more second resource units to a terminal, and each of the one or more second resource units may include 24 subcarrier sets; or each of the one or more second resource units may include 16 subcarrier sets; or each of the one or more second resource units may include 12 subcarrier sets. It should be noted that a specific value (for example, indicating a specific value in a set) assigned by the network device to the terminal may be indicated by the network device in a resource assignment indication (for example, resource assignment information and/or resource grouping information), or may be preset by a system or a standard.

By designing a combination of the first resource units under different transmission bandwidths, the problem that low-complexity DFT cannot be performed when the quantity of resources is not a product of powers of 2, 3, and 5 can be resolved, so that more flexible resource assignment can be implemented, and resource utilization can be improved as much as possible.

In another implementation, when the quantity of the plurality of first resource units assigned by the network device is not a product of powers of 2, 3, and 5, for the assigned C first resource units, a value A that is closest to the quantity of the plurality of first resource units and that is a product of powers of 2, 3, and 5 is determined, where A is less than C. When utilizing the assigned frequency domain resources, the terminal utilizes only A first resource units in the C first resource units, that is, performs transmission only on the A first resource units in the C first resource units. Because A is a product of powers of 2, 3, and 5, the DFT can be performed.

Optionally, for the remaining B=C−A first resource units, all or some of the signals carried by them are repeated on the A resources; that is, the DFT is performed on the modulation symbols based on the value of A, outputs are mapped on the A first resource units, and some of the outputs are repeated on the B first resource units.

The network device also indicates information about A and B to the terminal when assigning resources. The indicated information includes one or more combinations of the following: A available first resource units, B unavailable first resource units, or B first resource units that are repeatedly mapped. The information about A and B may be indicated by using a frequency domain resource assignment field in DCI or by adding a new field to the DCI.

For example, if the first resource unit is an RB and the second resource unit is in an interlace structure and includes 11 RBs, when the frequency domain resource assigned by the network device to a terminal includes one second resource unit, that is, C=11, in this case, A satisfying the condition is 10, and then B=C−A=11−10=1. The terminal performs transmission only on 10 RBs in the assigned frequency domain resources, and the remaining one RB is discarded, or some data is repeated on the remaining one RB.

By modifying the DCI, the network device may indicate a combination of frequency domain resources satisfying the product of the powers of 2, 3, and 5 to the terminal, thereby resolving a problem caused when the quantity of resources assigned needs to satisfy a constraint.

The communications system may include terminals having different processing capabilities or may include terminals having different operating modes. It can be understood that the corresponding terminals in the foregoing embodiments may have different processing capabilities or operate in different operating modes. The operating mode may include a mode in which the terminal supports a DFT-S-OFDM and an OFDM waveform, or a mode in which the terminal supports a DFT-S-OFDM waveform based on group/block precoding. In view of this, the network device also indicates the required processing capability and/or operating mode to the terminal. Optionally, a field used to indicate a processing capability and/or an operating mode is set in the DCI. For example, a field used to indicate block precoding is set, and one bit may be used to indicate whether the terminal operates in the block precoding mode. After receiving a field used to indicate the processing capability and/or operating mode, the terminal may switch to the corresponding operating mode. In another implementation, the field used to indicate the processing capability and/or the operating mode may alternatively be indicated by using other signaling, such as group common DCI or radio resource control (RRC) signaling. This is not limited in the embodiments.

Therefore, the network device can provide a better resource assignment mode for the terminal based on the processing capability or the operating mode of the terminal, thereby improving the system performance.

The foregoing has described a plurality of embodiments of the wireless communication method as examples. The following continues to describe embodiments of a network device, a terminal, and the like as examples.

First, the network device is described as an example. In an example, a structure of the network device includes a processor and a transceiver. In a possible example, the structure of the network device may further include a communications unit, where the communications unit is configured to support communication between the network device and another network-side device, for example, communication between the network device and a core network node. In another possible example, the structure of the network device may further include a memory, where the memory is coupled to the processor and is configured to store program instructions and data necessary for the network device.

Figure 7:
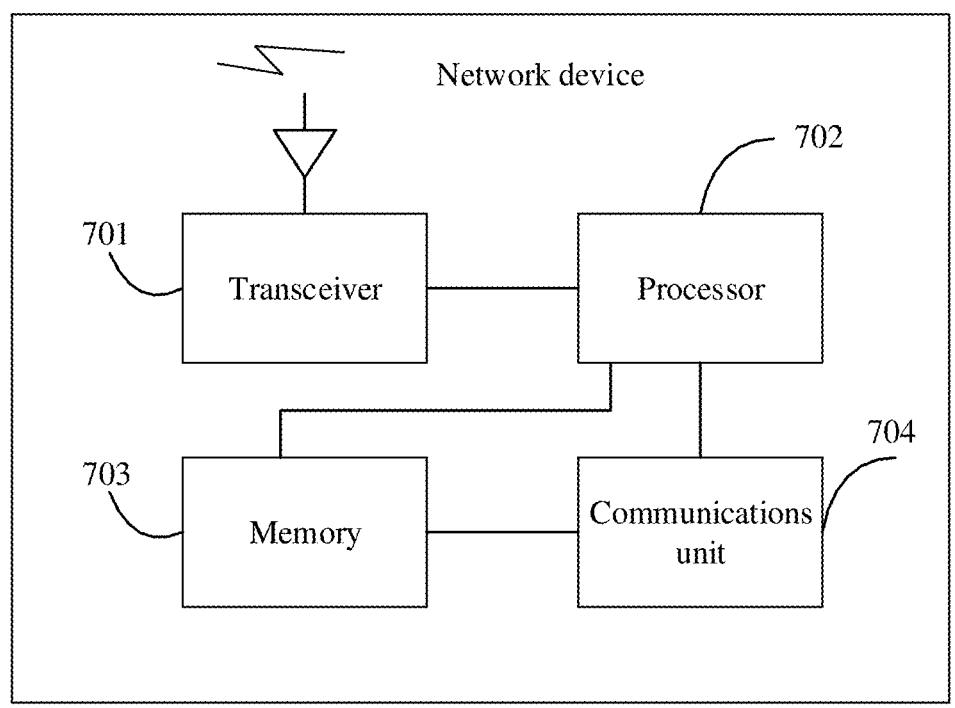
FIG. 7 is a simplified schematic structural diagram of a network device according to an embodiment.

FIG. 7 is a possible schematic structural diagram of the network device used in the foregoing method embodiments. The network device may be a base station or another network-side device having a function of a base station. In the structure shown in FIG. 7, the network device includes a transceiver 701, a processor 702, a memory 703, and a communications unit 704, where the transceiver 701, the processor 702, the memory 703, and the communications unit 704 are connected by using a bus.

In a downlink, the transceiver 701 adjusts output samples for to-be-sent data (for example, PDSCH) or signaling (for example, PDCCH), and generates a downlink signal, where the downlink signal is transmitted to the terminal in the foregoing embodiment through an antenna. In an uplink, the antenna receives the uplink signal transmitted by the terminal in the foregoing embodiment; and the transceiver 701 adjusts the signal received from the antenna and provides input samples. The processor 702 processes service data and a signaling message, such as modulating the to-be-sent data or generating an SC-FDMA symbol. These units perform processing by using radio access technologies (such as access technologies of LTE, 5G, and another evolved system) used by radio access networks. In the embodiments shown in FIG. 2 to FIG. 6, the transceiver 701 integrates a transmitter and a receiver. In another embodiment, the transmitter and the receiver may alternatively be independent of each other.

The processor 702 is further configured to control and manage the network device, so as to perform processing performed by the network device in the foregoing method embodiments. For example, the processor 702 is configured to control the network device to perform downlink transmission and/or another process in the technologies described in the embodiments. As an example, the processor 702 is configured to support the network device in performing the processing related to the network device in FIG. 2 to FIG. 6. When being used in an unlicensed frequency band scenario, the processor 702 also needs to control the network device to perform channel listening, so as to transmit data or signaling. For example, the processor 702 performs channel listening based on a signal received by the transceiver 701 from a transceiving apparatus or an antenna, and controls the signal to be transmitted through the antenna, so as to preempt a channel. In different embodiments, the processor 702 may include one or more processors, such as one or more central processing units (CPUs); and the processor 702 may be integrated into a chip, or may be a chip itself.

The memory 703 is configured to store related instructions and data, and program code and data of the network device. In different embodiments, the memory 703 includes, but is not limited to, a random access memory (RAM), a read-only memory (ROM), an erasable programmable read only memory (EPROM), or a compact disc read-only memory (-ROM). In this embodiment, the memory 703 is independent of the processor 702. In another embodiment, the memory 703 may alternatively be integrated into the processor 702.

For example, the processor 702 is further configured to control the transceiver 701 to send a resource assignment indication used to indicate frequency domain resource assignment, where the resource assignment indication is used to indicate a plurality of first resource units assigned to the terminal and that the plurality of first resource units are categorized into one or more groups, where a quantity of first resource units in each group is a product of powers of 2, 3, and 5.

It can be understood that FIG. 7 shows only a simplified design of the network device. In different embodiments, the network device may include any quantity of transmitters, receivers, processors, memories, and the like; and all network devices that may implement the embodiments fall within the protection scope of the embodiments.

Next, the terminal is described as an example. In an embodiment, a structure of the terminal includes a processor (or sometimes referred to as a controller), a transceiver, and a modem processor. In a possible example, the structure of the terminal may further include a memory, where the memory is coupled to the processor and is configured to store program instructions and data necessary for the terminal.

Figure 8:
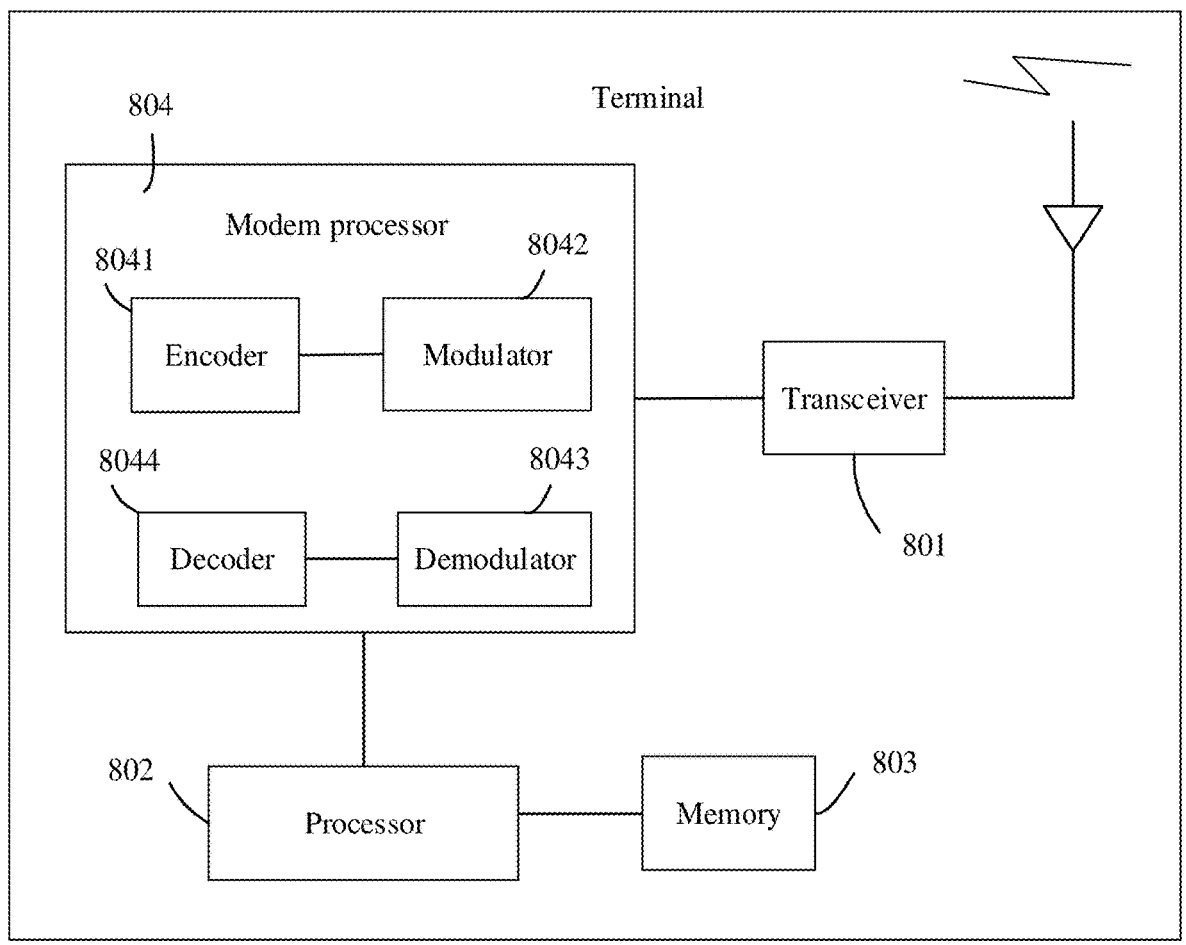
FIG. 8 is a simplified schematic structural diagram of a terminal according to an embodiment.

FIG. 8 is a simplified schematic diagram of a possible design structure of the terminal used in the foregoing method embodiments. The terminal includes a transceiver 801, a processor 802, a memory 803, and a modem 804, where the transceiver 801, the processor 802, the memory 803, and the modem 804 are connected by using a bus.

The transceiver 801 adjusts (for example, performing analog conversion, filtering, amplification, and up-conversion on) output samples, and generates an uplink signal, where the uplink signal is transmitted to the network device in the foregoing embodiments through an antenna. In a downlink, the antenna receives the downlink signal from the network device in the foregoing embodiment. The transceiver 801 adjusts (for example, performing filtering, amplification, down-conversion, and digitization on) the signal received from the antenna, and provides input samples. For example, in the modem 804, an encoder 8041 receives service data and a signaling message that are to be sent on the uplink, and processes (for example, performing formatting, encoding, and interleaving on) the service data and the signaling message. A modulator 8042 further processes (for example, performing symbol mapping and modulation on) the encoded service data and signaling message, and provides the foregoing output samples. A demodulator 8043 processes (for example, performing demodulation on) the foregoing input samples, and provides symbol estimates. A decoder 8044 processes (for example, performing de-interleaving and decoding on) the symbol estimates, and provides decoded data and a decoded signaling message that are to be sent to the terminal. The encoder 8041, the modulator 8042, the demodulator 8043, and the decoder 8044 may be implemented by an integrated modem processor 804. These units perform processing by using radio access technologies (such as access technologies of LTE, 5G, and another evolved system) used by radio access networks. In the embodiment shown in FIG. 8, the transceiver 801 integrates a transmitter and a receiver. In another embodiment, the transmitter and the receiver may alternatively be independent of each other.

The processor 802 controls and manages the terminal, so that the terminal performs the processing performed by the terminal in the foregoing method embodiment. For example, the processor 802 is configured to control the terminal to perform uplink transmission and/or another process in the technologies described. As an example, the processor 802 is configured to support the terminal in performing the processing related to the terminal in FIG. 2 to FIG. 6. For example, the transceiver 801 is configured to control receiving of a downlink signal or receive a downlink signal through an antenna. In different embodiments, the processor 802 may include one or more processors, such as one or more CPUs; and the processor 802 may be integrated into a chip or may be a chip itself.

The memory 803 is configured to store related instructions and data, and program code and data of the terminal. In different embodiments, the memory 803 includes, but is not limited to, RAM, a ROM, an EPROM), a non-transitory computer-readable storage medium, or a CD-ROM). In this embodiment, the memory 803 is independent of the processor 802. In another embodiment, the memory 803 may alternatively be integrated into the processor 802.

For example, the processor 802 is configured to control the transceiver to receive, from the network device, a resource assignment indication used to indicate frequency domain resource assignment, where the resource assignment indication is used to indicate a plurality of first resource units assigned to the terminal and that the plurality of first resource units are categorized into one or more groups, where a quantity of first resource units in each group is a product of powers of 2, 3, and 5.

The processor 802 performs DFT based on the plurality of first resource units. The processor 802 may be understood as a module or unit integrated into a baseband chip.

It can be understood that FIG. 8 shows only a simplified design of the terminal. In different embodiments, the terminal may include any quantity of transmitters, receivers, processors, memories, and the like, and all terminals that may implement the embodiments fall within the protection scope.

The embodiments further provide a resource assignment apparatus, where the resource assignment apparatus may be integrated into a terminal, or may be a terminal itself. The resource assignment apparatus is configured to perform the resource assignment methods in the embodiments shown in FIG. 2 to FIG. 6. The resource assignment apparatus may include a receiving module and a processing module, where the receiving module is configured to receive, from a network device, a resource assignment indication used to indicate frequency domain resource assignment, where the resource assignment indication is used to indicate a plurality of first resource units assigned to the terminal and that the plurality of first resource units are categorized into one or more groups, where a quantity of first resource units in each group is a product of powers of 2, 3, and 5; and the processing module performs DFT based on the plurality of first resource units.

The embodiments further provide a resource assignment apparatus, where the resource assignment apparatus may be integrated into a network device, or may be a network device itself. The resource assignment apparatus is configured to perform the resource assignment methods in the embodiments shown in FIG. 2 to FIG. 6. The resource assignment apparatus may be applied to a network device side. The resource assignment apparatus includes a sending module, where the sending module is configured to send, to a terminal, a resource assignment indication used to indicate frequency domain resource assignment, where the resource assignment indication is used to indicate a plurality of first resource units assigned to the terminal and that the plurality of first resource units are categorized into one or more groups, where a quantity of first resource units in each group is a product of powers of 2, 3, and 5.

In a possible embodiment, there further may be provided a wireless communications apparatus applied to a network device, where the wireless communications apparatus includes a processor; and the processor is configured to couple to a memory, read an instruction from the memory, and perform operations related to the network device in the foregoing embodiments according to the instruction. In this embodiment, the wireless communications apparatus applied to the network device may be understood as a chip or a chip apparatus, and the memory of the wireless communications apparatus is independent of the chip.

In another possible embodiment, there is further provided another wireless communications apparatus applied to a network device, where the wireless communications apparatus includes at least one processor and a memory; and the memory is coupled to the at least one processor, and the at least one processor is configured to perform operations related to the network device in the foregoing embodiments. In this embodiment, the wireless communications apparatus applied to the network device may be understood as a chip or a chip apparatus, and the memory of the wireless communications apparatus is integrated into the chip.

In a possible embodiment, an embodiment further provides a wireless communications apparatus applied to a terminal, where the wireless communications apparatus includes a processor; and the processor is configured to couple to a memory, read an instruction from the memory, and perform operations related to the terminal in the foregoing embodiments according to the instruction. In this embodiment, the wireless communications apparatus applied to the terminal may be understood as a chip or a chip apparatus, and the memory of the wireless communications apparatus is independent of the chip.

In another possible embodiment, an embodiment provides a wireless communications apparatus applied to a terminal, where the wireless communications apparatus includes at least one processor and a memory; and the memory is coupled to the at least one processor, and the at least one processor is configured to perform operations related to the terminal in the foregoing embodiments. In this embodiment, the wireless communications apparatus applied to the terminal may be understood as a chip or a chip apparatus, and the memory of the wireless communications apparatus is integrated into the chip.

All or some of the foregoing embodiments may be implemented by software, hardware, firmware, or any combination thereof. When being implemented by software, the embodiments may be implemented completely or partially in a form of a computer program product. The computer program product includes one or more computer instructions. When the computer program instructions are loaded and executed on the computer, the procedure or functions according to the embodiments are completely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

A person of ordinary skill in the art should be aware that, in the foregoing one or more examples, functions described may be implemented by hardware, software, firmware, or any combination thereof. When being implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any usable medium accessible to a general-purpose or special-purpose computer.

What is claimed is:

1. A resource assignment method, comprising:
receiving, by a terminal from a network device, a resource assignment indication used to indicate frequency domain resource assignment, wherein the resource assignment indication is used to indicate a plurality of first resource units assigned to the terminal and that the plurality of first resource units are categorized into one or more groups, and a quantity of first resource units in each group is a product of powers of 2, 3, and 5; and
performing, by the terminal, discrete Fourier transform (DFT) based on the plurality of first resource units;
wherein the resource assignment indication is used to indicate one or more second resource units assigned to the terminal, and each second resource unit comprises some of the plurality of first resource units; and
wherein the resource assignment indication is used to indicate one or more sets of first resource units, each set of first resource units is: $R_{start}+1+s*P$, wherein $R_{start}$ denotes an index of the $1^{st}$ first resource unit in each set of first resource units, $l=0,1,2 \ldots L-1$, l denotes a sequence number of a second resource unit, L denotes a quantity of second resource units assigned to the terminal, $s=0,1,2 \ldots Y-1$ or $s=0,1,2 \ldots Z-1$, s denotes a sequence number of a first resource unit in the second resource unit, Y or Z denotes a quantity of first resource units in the second resource unit, P denotes a quantity of first resource units that are on frequency domain resources and that are between two adjacent first resource units in one of the second resource units, $$Y = \left\lfloor \frac{X}{P} \right\rfloor, Z = \left\lceil \frac{X}{P} \right\rceil,$$

and X denotes a quantity of first resource units corresponding to a transmission bandwidth of the terminal.

2. The method according to claim 1, wherein the plurality of first resource units assigned to the terminal satisfy $C=M_1+M_2+\ldots+M_i$, wherein C is a total quantity of first resource units assigned to the terminal, i is a quantity of the groups, $M_1, M_2, \ldots$, and $M_i$ each are a quantity of first resource units comprised in a corresponding group, and i is a positive integer greater than or equal to 2; and the performing, by the terminal, DFT based on the plurality of first resource units comprises:
performing, by the terminal, DFT based on $M_1, M_2, \ldots$, and $M_i$ first resource units separately.

3. The method according to claim 2, wherein the terminal performs $N_1, N_2, \ldots$, and $N_i$ point DFT based on $M_1, M_2, \ldots$, and $M_i$ first resource units, respectively, wherein $N_1, N_2, \ldots$, and $N_i$ are quantities of subcarriers corresponding to $M_1, M_2, \ldots$, and $M_i$ first resource units, respectively.

4. The method according to claim 2, wherein when i=2, and values of $M_1$ and $M_2$ satisfy the following rule:
$M_1=k \times a$ and $M_2=j \times b$, wherein k, j, a, and b each are a product of powers of 2, 3, and 5.

5. The method according to claim 1, wherein the resource assignment indication comprises one or more pieces of resource assignment information, and each piece of the resource assignment information is used to indicate one set of first resource units.

6. The method according to claim 1, wherein the resource assignment indication is used to indicate one or more second resource units assigned to the terminal, and a quantity of first resource units comprised in each second resource unit is a product of powers of 2, 3, and 5.

7. The method according to claim 6, wherein when a plurality of second resource units are assigned to the terminal, and quantities of first resource units in at least two of the plurality of second resource units are different.

8. The method according to claim 1, wherein the resource assignment indication is carried in a frequency domain resource assignment field in downlink control information DCI.

9. The method according to claim 1, wherein information that is in the resource assignment indication and that is used to indicate the plurality of first resource units assigned to the terminal is carried in a frequency domain resource assignment field in DCI, and information that is in the resource assignment indication and that is used to indicate that the plurality of first resource units are categorized into one or more groups is carried in a newly added field in the DCI.

10. A resource assignment method, comprising:

sending, by a network device to a terminal, a resource assignment indication used to indicate frequency domain resource assignment, wherein the resource assignment indication is used to indicate a plurality of first resource units assigned to the terminal and that the plurality of first resource units are categorized into one or more groups, wherein a quantity of first resource units in each group is a product of powers of 2, 3, and 5;

wherein the resource assignment indication is used to indicate one or more second resource units assigned to the terminal, and a quantity of first resource units comprised in each second resource unit is a product of powers of 2, 3, and 5;

when a plurality of second resource units are assigned to the terminal, quantities of first resource units in at least two of the plurality of second resource units are different; and wherein the resource assignment indication is used to indicate one or more sets of first resource units, each set of first resource units is: $R_{start}+l+s*P$, wherein $R_{start}$ denotes an index of the $1^{st}$ first resource unit in each set of first resource units, l=0,1,2 ... L−1, l denotes a sequence number of a second resource unit, L denotes a quantity of second resource units assigned to the terminal, s=0,1,2 ... Y−1 or s=0,1,2 ... Z−1, s denotes a sequence number of a first resource unit in the second resource unit, Y or Z denotes a quantity of first resource units in the second resource unit, P denotes a quantity of first resource units that are on frequency domain resources and that are between two adjacent first resource units in one of the second resource units, $$Y = \left\lfloor \frac{X}{P} \right\rfloor, Z = \left\lceil \frac{X}{P} \right\rceil,$$

and X denotes a quantity of first resource units corresponding to a transmission bandwidth of the terminal.

11. The method according to claim 10, wherein the plurality of first resource units assigned to the terminal satisfy $C=M_1+M_2+ \ldots +M_i$, wherein C is a total quantity of first resource units assigned to the terminal, i is a quantity of the groups, $M_1, M_2, \ldots,$ and $M_i$ each are a quantity of first resource units comprised in a corresponding group, and i is a positive integer greater than or equal to 2.

12. The method according to claim 11, wherein when i=2, and values of $M_1$ and $M_2$ satisfy the following rule:

$M_1=k \times a$ and $M_2=j \times b$, wherein k, j, a, and b each are a product of powers of 2, 3, and 5.

13. The method according to claim 11, wherein the resource assignment indication comprises one or more pieces of resource assignment information, and each piece of the resource assignment information is used to indicate one set of first resource units.

14. The method according to claim 10, wherein the resource assignment indication is used to indicate one or more second resource units assigned to the terminal, and each second resource unit comprises some of the plurality of first resource units.

15. A terminal, comprising a transceiver and a processor, wherein the transceiver is configured to receive, from a network device, a resource assignment indication used to indicate frequency domain resource assignment, the resource assignment indication is used to indicate a plurality of first resource units assigned to the terminal and that the plurality of first resource units are categorized into one or more groups, and a quantity of first resource units in each group is a product of powers of 2, 3, and 5; and the processor is configured to perform discrete Fourier transform (DFT) based on the plurality of first resource units;

wherein the resource assignment indication is used to indicate one or more second resource units assigned to the terminal, and each second resource unit comprises some of the plurality of first resource units; and wherein the resource assignment indication is used to indicate one or more sets of first resource units, each set of first resource units is: $R_{start}+l+s*P$, wherein $R_{start}$ denotes an index of the $1^{st}$ first resource unit in each set of first resource units, l=0,1,2 ... L−1, l denotes a sequence number of a second resource unit, L denotes a quantity of second resource units assigned to the terminal, s=0,1,2 ... Y−1 or s=0,1,2 ... Z−1, s denotes a sequence number of a first resource unit in the second resource unit, Y or Z denotes a quantity of first resource units in the second resource unit, P denotes a quantity of first resource units that are on frequency domain resources and that are between two adjacent first resource units in one of the second resource units, $$Y = \left\lfloor \frac{X}{P} \right\rfloor, Z = \left\lceil \frac{X}{P} \right\rceil,$$

and X denotes a quantity of first resource units corresponding to a transmission bandwidth of the terminal.

* * * * *